United States Patent [19]

Danley

[11] Patent Number: 4,788,397
[45] Date of Patent: * Nov. 29, 1988

[54] DRIVE MOTOR ASSEMBLY AND TURNTABLE UTILIZABLE THE SAME

[75] Inventor: Allen M. Danley, Eagan, Minn.

[73] Assignee: Plastics, Inc., St. Paul, Minn.

[*] Notice: The portion of the term of this patent subsequent to Mar. 3, 2004 has been disclaimed.

[21] Appl. No.: 2,799

[22] Filed: Jan. 13, 1987

Related U.S. Application Data

[63] Continuation of Ser. No. 801,496, Nov. 22, 1985, Pat. No. 4,647,745, which is a continuation of Ser. No. 397,326, Jul. 12, 1982, abandoned.

[51] Int. Cl.⁴ .................. H05B 6/80; A47B 11/00
[52] U.S. Cl. .................. 219/10.55 F; 219/10.55 E; 108/139; 108/20; 126/338; 99/443 R
[58] Field of Search ............ 219/10.55 E, 10.55 F, 219/10.55 R, 10.55 D; 99/443 R, 451, DIG. 14; 126/338, 182; 108/20, 139, 142

[56] References Cited

U.S. PATENT DOCUMENTS

| | | | |
|---|---|---|---|
| 534,423 | 2/1895 | Borken | 108/20 |
| 905,018 | 11/1908 | Sullivan et al. | 108/20 |
| 2,338,324 | 1/1944 | Floyd | 108/20 |
| 3,854,021 | 12/1974 | Moore et al. | 219/10.55 |
| 4,121,078 | 10/1978 | Takano et al. | 219/10.55 E |
| 4,208,561 | 6/1980 | Sitzler | 219/10.55 E |
| 4,216,727 | 8/1980 | Cunningham | 108/139 |
| 4,219,715 | 8/1980 | Mandle et al. | 219/10.55 F |
| 4,239,009 | 12/1980 | Cunningham | 219/10.55 |
| 4,254,319 | 3/1981 | Beh et al. | 108/20 |
| 4,258,630 | 3/1981 | Jorgensen et al. | 219/10.55 F |
| 4,308,445 | 12/1981 | Offutt | 219/10.55 F |
| 4,330,696 | 5/1981 | Pomeroy | 108/20 |
| 4,434,343 | 2/1984 | Bowen et al. | 219/10.55 F |
| 4,504,715 | 3/1985 | Jorgensen et al. | 219/10.55 F |
| 4,647,745 | 3/1987 | Danley | 219/10.55 F |

FOREIGN PATENT DOCUMENTS

| | | |
|---|---|---|
| 73421 | 6/1974 | Japan . |
| 71877 | 5/1975 | Japan . |
| 36741 | 3/1976 | Japan . |

*Primary Examiner*—Philip H. Leung
*Assistant Examiner*—Leon K. Fuller
*Attorney, Agent, or Firm*—Flehr, Hohbach, Test, Albritton & Herbert

[57] ABSTRACT

Portable turntable and drive motor assembly for use in microwave ovens. The drive motor assembly is positioned to one side of the turntable platform and has a low profile so that it will not interfere with the rotation of overhanging objects on the platform. In the principal embodiment disclosed, the drive motor is spring powered.

23 Claims, 3 Drawing Sheets

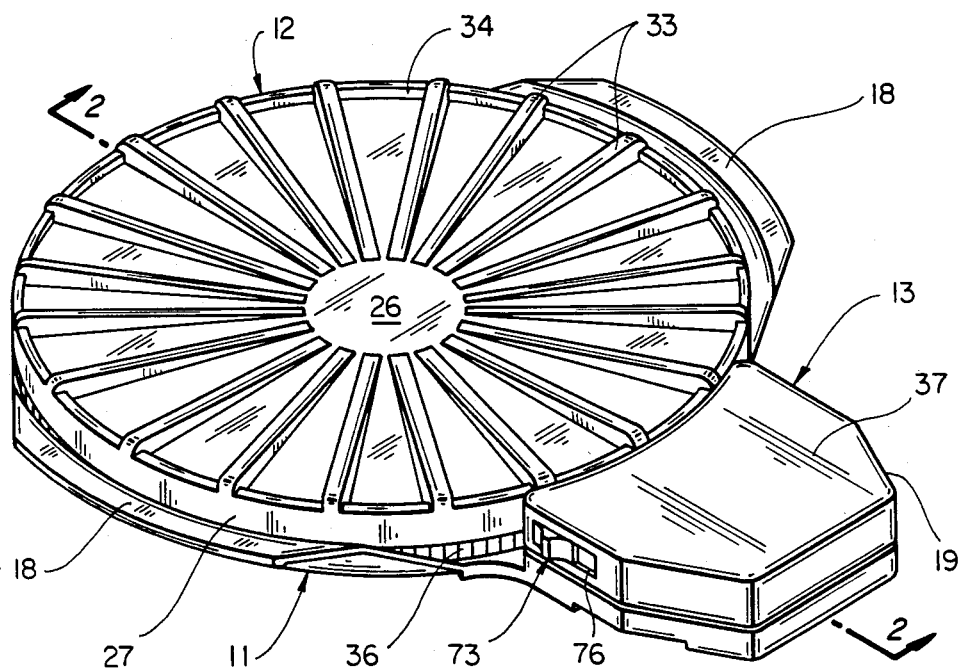
FIG_1
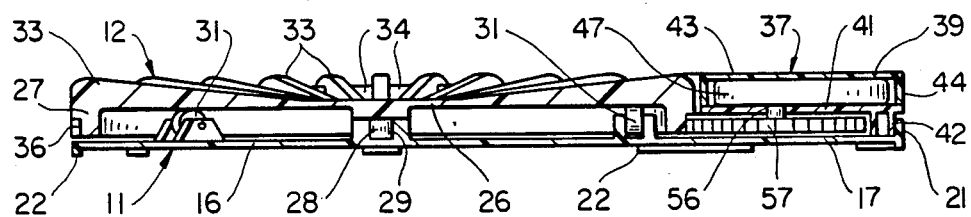
FIG_2

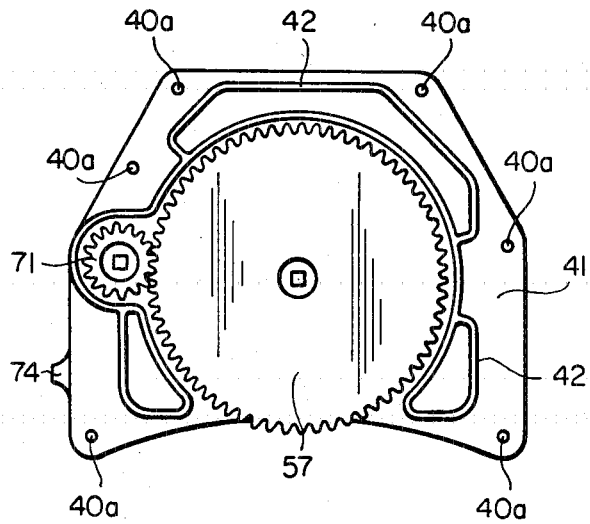
FIG_3
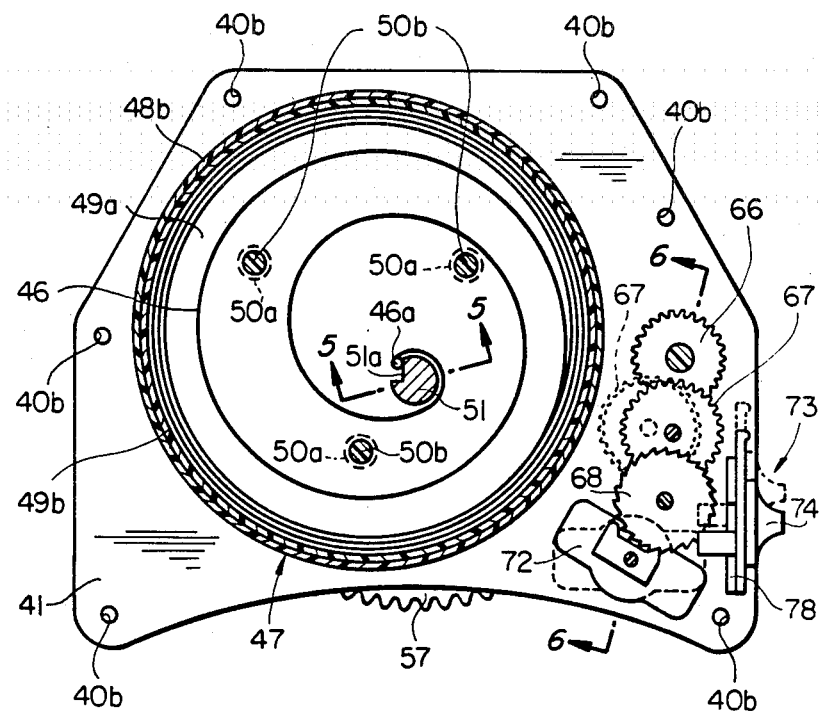
FIG_4

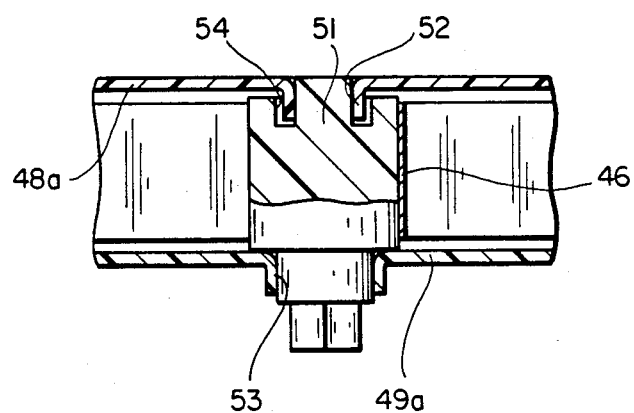
FIG_5
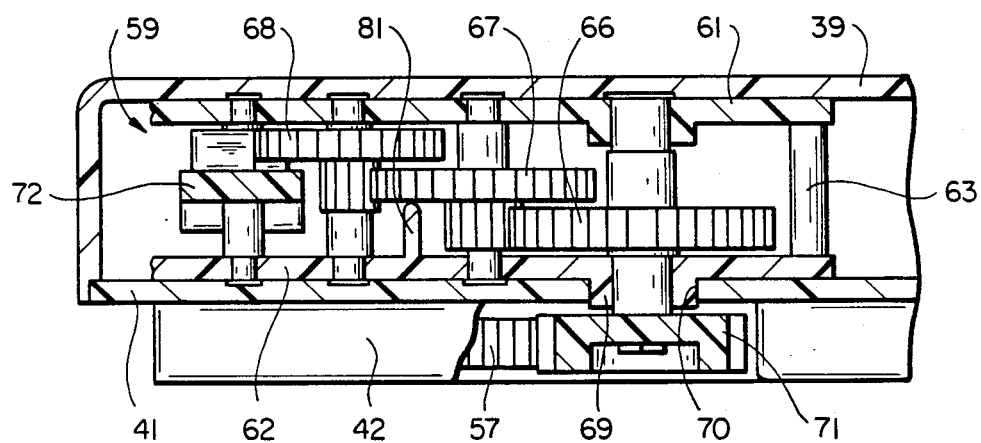
FIG_6

DRIVE MOTOR ASSEMBLY AND TURNTABLE UTILIZABLE THE SAME

This is a continuation of Ser. No. 801,496 filed Nov. 22, 1985 now U.S. Pat. No. 4,647,745 which is a continuation of Ser. No. 397,326 filed July 12, 1982, now abandoned.

This invention pertains generally to microwave heating and cooking apparatus, and more particularly to a portable turntable and drive motor assembly for use in a microwave oven.

In recent years, portable turntables have been provided for use in microwave ovens. Examples of portable turntables utilizing spring operated drive motors are found in U.S. Pat. Nos. 4,216,727, 4,239,009, 4,254,319 and 4,258,630. In each of these turntables, the drive motor is positioned beneath the rotating platform, and this arrangement has certain limitations and disadvantages, such as interference with the distribution of microwave energy below the platform, raising the platform so that food carried thereby will be out of the region in which some ovens heat most effectively, and limiting the height of food products which can be cooked in some ovens. Other examples of turntables in which the drive motor is positioned below the platform are found in U.S. Pat. No. 4,219,715 and in Japanese Utility Model Application No. 52-92454.

U.S. Pat. No. 4,330,696 describes a portable turntable in which the drive motor is positioned to one side of the platform, thereby avoiding the problems of turntables having the drive motor beneath the platform. With the drive motor positioned to the side of the turntable, however, problems can still arise with certain containers and certain food products which extend laterally beyond the edge of the platform and strike the motor assembly as they are rotated.

It is in general an object of the invention to provide a new and improved turntable and drive motor assembly which overcome the foregoing and other disadvantages of turntables and motor assemblies heretofore provided for use in microwave ovens.

Another object of the invention is to provide a turntable and drive motor assembly of the above character is which the motor assembly is positioned to one side of the turntable platform and has a height no greater than the height of the platform to provide vertical clearance between the motor assembly and overhanging objects carried by the platform.

Another object of the invention is to provide a turntable and drive motor assembly of the above character which can be manufactured economically.

These and other objects are achieved in accordance with the invention by providing a portable turntable having a base, a platform rotatively mounted on the base, and a drive motor assembly mounted on the base to one side of the platform for rotatively driving the platform. The drive motor assembly has a height no greater than the height of the platform whereby vertical clearance is provided between the motor assembly and any overhanging object carried by the platform so that the motor assembly will not interfere with the rotation of that object. In one presently preferred embodiment, the drive motor assembly comprises an energy storage spring mounted in spiral fashion in a generally horizontal plane, an output member rotatively driven by the spring for imparting rotation to the platform, and an escapement positioned beside the spring in the horizontal plane for regulating the speed at which the output member is rotated.

FIG. 1 is a perspective view of one embodiment of a portable turntable and drive motor assembly according to the invention.

FIG. 2 is an enlarged centerline sectional view taken along line 2—2 in FIG. 1.

FIG. 3 is a bottom plan view of the drive motor assembly in the embodiment of FIG. 1.

FIG. 4 is an enlarged horizontal sectional view of the drive motor assembly in the embodiment of FIG. 1.

FIG. 5 is a cross-sectional view taken along line 5—5 in FIG. 4.

FIG. 6 is a cross-sectional view taken along line 6—6 in FIG. 4.

As illustrated in FIG. 1, the turntable comprises a generally planar base 11 adapted to rest on a supporting surface such as the floor of a microwave oven cavity, a food supporting platform 12 rotatively mounted on the base, and a drive motor assembly 13 removably mounted on the base to one side of the platform for rotatively driving the platform.

Base 11 has a generally circular central portion 16 on which the platform is mounted, a flange portion 17 which extends from one side of the central portion for receiving the drive motor assembly, and a pair of handles 18 which project upwardly and outwardly from opposite sides of the central portion. Flange portion 17 is generally rectangular in plan view, with beveled outer corners 19 to facilitate placement in the corner of the rectangular oven cavity. The flange portion has an upstanding peripheral rim 21 which serves to retain the motor assembly laterally in position on the base. A plurality of mounting feet 22 project from the underside of the base is spaced apart locations and rest upon the oven cavity floor or other supporting surface.

Platform 12 comprises a generally planar horizontally extending deck 26 with a depending peripheral skirt 27 of substantially lesser dimension than the diameter of the deck whereby the platform has a low profile. In one present embodiment, for example, the platform has a height on the order of one inch and a diameter on the order of ten inches. The platform is journalled for rotation about its axis by a depending axle 28 received in a bearing 29 carried by the base at the center of portion 16. The underside of deck 27 rests upon rollers 31 carried by the base at locations spaced about the axis of rotation, whereby the platform is supported for rolling movement about the axis.

A plurality of radially extending ribs 33 and a peripheral rim 34 project upwardly from the upper surface of the platform deck. The ribs provide means by which the platform can be gripped and turned manually to wind the drive motor spring. In addition, the ribs minimize the area of contact between the platform and objects carried by the platform and permit air to circulate between the platform and the objects. This serves to reduce the transfer of heat from the objects to the platform, providing better heating of the objects and reducing the possibility that someone using the turntable will be burned by contact with a hot platform.

A peripheral ring of outwardly facing gear teeth 36 is formed in the lower portion of the platform skirt for meshing engagement with the output gear of the drive motor assembly.

In one presently preferred embodiment, base 11 and platform 12 are each fabricated as a unitary structure of a plastic material which does not interact with microwave energy. One preferred material is a modified thermoset plastic as used in the MICROWARE cookware of Plastics, Inc., St. Paul, Minn. Other suitable materials for a turntable intended for use in a microwave oven include polysulfone, thermoplastic polyesters, polypropylene, polycarbonate, polystyrene, acrylonitrile, butadiene, styrene, polyphenylene oxide, acrylic and polyethylene.

Drive motor assembly 13 includes a housing 37 comprising a base member 38 and a cover 39. Base member 38 comprises a generally planar plate 41 having the same general contour as the flange portion 17 of turntable base 11, with depending flanges 42 which mate with peripheral rim 21 to retain the motor assembly on the base. Cover 39 includes a generally planar top wall 43 and a depending side wall having a contour corresponding to the periphery of base plate 41. Cover 39 is secured to base plate 41 by studs 40a which extend from the lower portion of the cover through openings 40b in the base plate and are fixed to sonic welding on the underside of the base plate. The overall height of the motor housing is such that the upper surface of top wall 43 is no higher than the top of platform 12. This relationship is significant because it provides vertical clearance between the motor assembly and overhanging food products or other objects which extend laterally beyond the periphery of the platform, thereby preventing possible interference with the rotation of such objects.

An energy storage spring 46 is enclosed within a shielding enclosure 47 fabricated of a material such as metal which is reflective to microwave energy. This enclosure is mounted on the upper side of base plate 41 between the base plate and cover 39 and includes a pair of cup-shaped sections 48, 49 having generally planar top/bottom walls 48a, 49a and generally cylindrical side walls 48b, 49b which are pressed together to form a microwave-tight enclosure. Spring 46 comprises an elongated strip of suitable material such as stainless steel wound in spiral fashion in a generally horizontal plane about a vertically extending arbor 51. The outer end of the spring is affixed to the enclosure, and the inner end is formed with a loop or hook 46a which is received in a notch 51a of generally sector-shaped cross-sectional area in one side of the arbor body. This provides a positive connection both when the arbor is rotated in the proper direction (i.e., counter-clockwise in FIG. 4) to wind the spring and when the spring is turning the arbor in the opposite direction. However, when the spring is fully unwound, the arbor will turn freely within the innermost convolution of the spring, whereby the spring is protected from damage due to winding in the wrong direction. The arbor is journalled for rotation in bushings 52, 53 on the upper and lower walls of the enclosure. As best seen in FIG. 5, each of the bushings includes a downwardly extending cylindrical flange formed as a unitary structure with the wall of the enclosure on which it is located. The downwardly extending flange of the upper bushing is received in an annular recess 54 formed in the upper surface of the body portion of arbor 51. The diameters and lengths of the openings in the bushings are selected to form microwave attenuating passageways, whereby microwave energy is prevented from entering enclosure 47. The height of enclosure 47 is substantially equal to the distance between the underside of housing cover 39 and the upper surface of base plate 41, and the enclosure is retained in position in the housing by bosses 50a which project downwardly from the bottom wall 49a of the enclosure and are received in sprockets 50b in the upper surface of plate 41.

As best seen in FIG. 5, the arbor 51 is positioned eccentrically of enclosure 47, being offset forwardly toward the turntable platform and to one side of the center of the enclosure.

The lower portion of motor arbor 51 extends through an opening 56 in base plate 41, and a drive gear or output gear 57 is affixed to the lower end of the arbor below the base plate. This gear projects beyond the platform side of the motor housing and meshes in driving relationship with the gear teeth 36 on the platform.

An escapement mechanism 59 is mounted within the motor housing to one side of enclosure 47 for regulating the speed at which output gear 57 is rotated by spring 46. This mechanism includes upper and lower gear plates 61, 62 which are held in spaced, parallel relationship by posts 63, with a gear train comprising an input gear 66, an intermediate gear 67 and a ratched gear or star wheel 68 mounted between the plates. Input gear 66 has an axle portion which extends through a downwardly extending boss 69 in gear plate 62 and an opening 70 in base plate 41. A transfer ear 71 is affixed to the lower portion of the axle portion below the base plate in driving engagement with output gear 57. Ratched gear 68 drives a governor or pendulum 72 which is typically mounted between gear plates 61, 62. In one presently preferred embodiment, the escapement gear tran provides a step up ratio of 144:1, and output gear 57 rotates at a speed of about 1.5 rpm. The gear ratio between the output gear and the turntable platform gear is 3.42:1, and a spring wound around the motor arbor for 45 turns provides 30 minutes of platform rotation at a speed of about 0.43 rpm.

The distance between the upper side of gear plate 61 and the lower side of gear plate 62 is approximately equal to the distance between the lower surface of cover 39 and the upper surface of base plate 41, and the escapement mechanism is retained in position in the motor housing by boss 69 and opening 70 and by additional bosses and sockets (not shown) on the lower gear plate and the base plate.

An ON/OFF switch 73 provides means for preventing spring 46 from rotating output gear 57 when the spring is in its wound or partially wound condition. This switch includes a body having a manually engagable handle 74 which extends outwardly through an opening 76 in the side wall of motor housing 37, and an inwardly extending tang 77 which engages the escapement pendulum to prevent oscillation of the same when the switch is in its OFF position, as shown by solid lines in FIG. 4. The switch body is slidably mounted for movement in a track formed by a pair of generally parallel ribs 78 on the upper side of base plate 41. A corresponding track is formed on the underside of cover 39 by a rib (not shown) and the side wall of the housing. When the switch is in its ON position, as illustrated by dashed lines in FIG. 4, tank 77 is positioned clear of pendulum 72, and the pendulum is freed to oscillate.

As best illustrated in FIG. 4, the axis of intermediate gear 67 shifts between two positions in response to rotation of output gear 57 in opposite directions. When the output gear is driven in the normal direction (clockwise as viewed in FIG. 4) by spring 46, input gear 66 rotates in the counterclockwise direction, and intermediate gear 67 is held in driving engagement with ratchet gear 68, as illustrated by solid lines in FIG. 4. When, however, output gear 57 is rotated in the counterclockwise direction (e.g., by turning platform 12 manually in the clockwise direction to wind spring 46), drive gear 66 rotates in the counterclockwise direction, shifting intermediate gear 57 out of engagement with ratchet gear 68, as illustrated by dashed lines in FIG. 4. Thus, the motor spring can be wound with switch 73 in either the ON position or the OFF position. Support for gear 67 in its shifting movement is provided by an arcuate flange 81 which projects upwardly from lower gear plate 62.

In one presently preferred embodiment, output gear 57, transfer gear 71, and the entire escapement mechanism are fabricated of a non-metallic material such as a plastic which does not interact with microwave energy. One suitable material for the gears and gear plates is polycarbonate with 10–15% PTFE for lubrication and 10–20% glass fibers for reinforcement. Housing 37 is likewise fabricated of a plastic material such as polycarbonate.

Operation and use of the turntable and drive motor assembly is as follows. With platform 12 and drive motor assembly 13 mounted on base 11 as illustrated in FIG. 1, motor spring 47 can be wound around arbor 51 by rotating the platform manually in the clockwise direction as viewed from above. Of the turntable is turned in the opposite direction, arbor 51 will turn freely within the spring when the spring is in its fully unwound or relaxed condition, so that the spring cannot be damaged by winding in the wrong direction. ON/OFF switch 73 will normally being the OFF position while the spring is being wound, but it can be in either position.

The turntable is placed in the cavity of a microwave oven, with the drive motor assembly in a corner of the cavity, the food product or other object to be heated is placed on the platform, and switch 73 is placed in the ON position to permit the drive gear and the platform to be rotated by the motor spring. Rotation of the platform can be stopped at any time by moving the switch to the OFF position. The platform can be rotated to wind the spring when the turntable is inside the oven cavity as well as outside the oven.

The turntable and drive motor assembly have a number of important features and advantages. Being positioned to one side of the turntable platform and being of relatively low profile, the drive motor assembly will not interfere with the rotation of food products and other objects which extend laterally from the platform. Since the platform and the drive motor are removably mounted on the base, the turntable is readily disassembled for cleaning. The turntable and the motor assembly are rugged and reliable in operation, and they require relatively few parts, most of which can be fabricated of plastic by a relatively inexpensive molding process. Moreover, no screws or other fasteners are required in the assembly of the drive motor unit, and this enables the device to be manufactured even more economically. Additionally, the motor assembly is essentially tamper-proof once it is put together so that it is not likely to be damaged by being taken apart by the user.

It is apparent from the foregoing that a new and improved turntable and drive motor assembly have been provided. While only one presently preferred embodiment has been described in detail, as will be apparent to those familiar with the art, certain changes and modifications can be made without departing from the scope of the invention as defined by the following claims.

What is claimed is:

1. A portable turntable for use in a microwave oven, comprising a base, a horizontally extending platform mounted on the base for rotation about a vertically extending axis, a microwave reflective enclosure, means including a metallic energy storage spring wound in spiral fashion in a generally horizontal plane within the enclosure for effecting relative rotation of the platform and base without substantial leakage of microwave energy into the enclosure, and means fabricated of a material which does not interact with microwave energy coupled to the platform for regulating the speed at which the platform is rotated.

2. The turntable of claim 1 wherein the platform has a ring of gear teeth, and the means for effecting relative rotation comprises a drive gear in meshing engagement with the ring of gear teeth.

3. The turntable of claim 2 wherein the means for regulating the speed at which the platform is rotated is coupled to the platform through the drive gear.

4. The turntable of claim 1 wherein the means for regulating the speed at which the platform is rotated comprises an escapement mechanism.

5. A drive cover assembly for use in a microwave oven, comprising a microwave reflective enclosure, an output member fabricated of a material which does not interact with microwave energy positioned outside the enclosure, and means including a metallic energy storage spring wound in spiral fashion in a plane within the microwave reflective enclosure for driving the output member without substantial leakage of microwave energy into the enclosure, and means fabricated of a material which does not interact with microwave energy positioned outside the reflective enclosure in generally the same plane as the spring for regulating the speed at which the output member is driven.

6. The drive motor assembly of claim 5 wherein the means for regulating the speed at which the output member is driven includes a first gear with an axis which shifts between first and second positions in response to rotation of the output member in opposite directions, a second gear engaged by the first gear when the output member is rotated in one direction by the spring and is disengaged from the first gear when the output member is rotated in the opposite direction, a ratchet gear driven by the second gear, a pendulum driven by the ratchet gear, and an ON/OFF switch engageable with the pendulum to prevent rotation of the output member by the spring.

7. The drive motor assembly of claim 5 wherein the output member passes through a microwave attenuating passageway in the microwave reflective enclosure.

8. A portable turntable for use in a microwave oven, comprising a base member, a platform member rotatively mounted on the base member, said base member and said platform member each being fabricated of a material which does not interact with microwave energy, a microwave reflective enclosure mounted on one of said members, means including a metallic energy storage spring wound in spiral fashion within the enclosure for rotating the platform member relative to the base member without substantial leakage of microwave energy into the enclosure, and means positioned outside the microwave reflective enclosure and fabricated of a material which does not interact with microwave energy for regulating the speed at which the platform member is rotated.

9. The turntable of claim 8 wherein the microwave reflective enclosure is mounted on the base member and has a height no greater than the platform member.

10. In a portable turntable for use in a microwave oven: a base member and a platform member each fabricated of a material which does not interact with microwave energy, a microwave reflective enclosure mounted on one of said members, means including a metallic energy storage spring wound in spiral fashion within the enclosure for effecting relative rotation of the platform and base members with substantially no leakage of microwave energy into the enclosure, said enclosure being of relatively small dimension and having a cylindrical side wall with a diameter corresponding to the outermost convolution of the spring when the spring is relaxed, and means positioned outside the enclosure and fabricated of material which does not interact with microwave energy for regulating the speed of the relative rotation of the platform and base members.

11. The turntable of claim 10 including an output gear fabricated of a material which does not interact with microwave energy rotatively driven by the spring through a microwave attenuating passageway in the microwave reflective enclosure, and a ring of gear teeth on the other of said platform and base members engaged by the output gear to effect the relative rotation of the platform and base members.

12. A portable turntable for use in a microwave oven, comprising a horizontally extending platform rotatable about a vertically extending axis, a microwave reflective enclosure, means including a metallic energy storage spring wound in spiral fashion in a generally horizontal plane within the enclosure for rotating the platform about the axis without substantial leakage of microwave energy into the enclosure, and means fabricated of a material which does not interact with microwave energy coupled to the platform for regulating the speed at which the platform is rotated.

13. The turntable of claim 12 wherein the means for regulating the speed at which the platform is rotated is positioned outside the microwave reflective enclosure.

14. The turntable of claim 12 wherein the microwave reflective enclosure comprises a metal housing of substantially lesser horizontal extent than the platform, and the means for regulating the speed at which the platform is rotated is positioned outside the housing.

15. The turntable of claim 14 wherein the housing has a cylindrical side wall with a diameter corresponding to the outer most convolution of the spring when the spring is relaxed.

16. In a portable turntable for use in a microwave oven having a horizontally extending platform rotatable about a vertically extending axis and a drive motor shielded from microwave energy operably connected to the platform with means for regulating the speed at which the platform is rotated, the improvement wherein the drive motor includes a metallic energy storage spring wound in spiral fashion in a relatively small motor housing which is only large enough to contain the spring, and the means for regulating the speed at which the platform is rotated is fabricated of a material which does not interact with microwave energy and is positioned outside the motor housing.

17. The turntable of claim 16 wherein the motor housing is fabricated of metal.

18. In a portable turntable for use in a microwave oven: a horizontally extending platform rotatable about a vertically extending axis, a drive motor shielded from microwave energy operably connected to the platform, said drive motor comprising a metallic energy storage spring wounded sprial fashion in a relatively small motor housing which is only large enough to contain the spring, and means fabricated of a material which does not interact with microwave energy positioned outside the motor housing for regulating the speed at which the platform is rotated.

19. The turntable of claim 18 wherein the motor housing is fabricated of a material which is reflective to microwave energy.

20. In a portable turntable for use in a microwave oven having a horizontally extending platform rotatable about a vertically extending axis and a drive motor shielded from microwave energy operably connected to the platform with means for regulating the speed at which the platform is rotated, the improvement wherein the drive motor includes a metallic energy storage spring wound in spiral fashion in a relatively small motor housing which does not extend higher than the platform and is only large enough to contain the spring, and the means for regulating the speed at which the platform is rotated is fabricated of a material which does not interact with microwave energy and is positioned outside the motor housing without extending higher than the platform.

21. The turntable of claim 20 wherein the motor housing is fabricated of a material which is reflective to microwave energy.

22. The turntable of claim 20 wherein the means for regulating the speed at which the platform is rotated is positioned to the side of the motor housing.

23. The turntable of claim 20 wherein the outer end of the spring is connected to the motor housing, and the inner end of the spring is connected to an arbor which passes through a microwave attenuating passageway in the motor housing.

* * * * *